United States Patent
Gerwig et al.

(10) Patent No.: US 7,392,273 B2
(45) Date of Patent: Jun. 24, 2008

(54) HIGH-STICKY CALCULATION IN PIPELINED FUSED MULTIPLY/ADD CIRCUITRY

(75) Inventors: Guenter Gerwig, Simmozheim (DE); Juergen Haess, Schoenaich (DE); Klaus Michael Kroener, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 10/732,039

(22) Filed: Dec. 10, 2003

(65) Prior Publication Data

US 2004/0122886 A1    Jun. 24, 2004

(30) Foreign Application Priority Data

Dec. 20, 2002    (EP) .................. 02102853

(51) Int. Cl.
*G06F 7/485* (2006.01)
*G06F 7/787* (2006.01)

(52) U.S. Cl. .................................... 708/501
(58) Field of Classification Search ................. 708/501
See application file for complete search history.

(56) References Cited

U.S. PATENT DOCUMENTS

| | | | |
|---|---|---|---|
| 5,993,051 A * | 11/1999 | Jiang et al. ............... 708/501 |
| 6,115,729 A * | 9/2000 | Matheny et al. ........... 708/501 |
| 6,381,624 B1 * | 4/2002 | Colon-Bonet et al. ...... 708/501 |
| 6,542,916 B1 * | 4/2003 | Hinds et al. ............... 708/501 |
| 2002/0107900 A1 * | 8/2002 | Enenkel et al. ............ 708/501 |
| 2003/0041082 A1 * | 2/2003 | Dibrino ..................... 708/501 |
| 2003/0212726 A1 * | 11/2003 | Luick ........................ 708/501 |

* cited by examiner

*Primary Examiner*—D. H. Malzahn
(74) *Attorney, Agent, or Firm*—Lynn L. Augspurger

(57) ABSTRACT

Arithmetic processing circuits in a circuit in a floating point processor having a fused multiply/ADD circuitry. In order to avoid waiting cycles in the normalizer of the floating point arithmetic, control logic calculates in an extremely early state of the overall Multiply/Add processing. Parts of the intermediate add result are significant and have to be selected in the pre-normalizer multiplexer to be fed to the normalizer by counting the leading zero bits (LAB) of the addend in a dedicated circuit right at the beginning of the pipe. LAB is added to the shift amount (SA) that is calculated to align the addend and is then compared with the width of the incrementer. If the sum of (SA+LAB) is larger than the width of the incrementer, which is a constant value, then no significant bits are in the high-part of the intermediate result, and the pre-normalizer multiplexer selects the data from a second predetermined position, otherwise from a first predetermined position.

3 Claims, 3 Drawing Sheets

HIGH-STICKY CALCULATION IN PIPELINED FUSED MULTIPLY/ADD CIRCUITRY

BACKGROUND OF THE INVENTION

The present invention relates to arithmetic processing circuits in a computer system and, in particular to a circuit in a floating point processor having a fused multiply/ADD circuitry.

Arithmetic processing circuitry for binary numbers of latest prior art typically employs floating point arithmetic in accordance with the IEEE 754 standard. Floating point arithmetic, used in addition, multiplication, and division, first normalizes the binary numbers to be added, multiplied, or divided by shifting the binary numbers until, for a positive number, the first non-zero digit (i.e., 1) is immediately to the left of the radix point such that the mantissa part of the binary numbers is greater than or equal to one and less than two. A negative binary number will have leading ones. Thus, to normalize a negative number, the number must be shifted so that the first zero is immediately to the left of the radix point.

For multiplication, the normalized binary numbers are then multiplied and their exponents are added. For division, the normalized binary numbers are divided and their exponents are subtracted. For addition and subtraction, the normalized numbers must be shifted (i.e., aligned) so that their exponents are equal, then the numbers are added or subtracted.

To normalize a binary number, the number of leading zeros (for a positive number) or leading ones (for a negative number) must be quickly determined so that the number of shifts of the binary number can be quickly performed for the next arithmetic operation. Ideally, the leading one count or leading zero count (LZC) is performed in parallel with the arithmetic operation so that shifting can be performed immediately after the arithmetic operation.

A fused ADD/multiply (FPU) circuitry of the above type and operation is disclosed in U.S. Pat. No. 5,993,051.

For providing a very fast arithmetic processing circuit for generating said binary number, calculating the number of leading ones or zeroes in the number, and then shifting the number to produce a normalized binary result for a next floating point arithmetic operation, it is proposed in said US Patent to implement a combined leading zero anticipator (LZA) and leading one anticipator (LOA) connected to an output of a carry save adder (CSA) of said Multiply/Add circuitry, said combined leading zero anticipator and leading one anticipator calculating leading ones or leading zeros of an output of said adder in parallel with said adder adding said sum and carry bits, whereby the LZA input comes from the CSA adder.

Thus, as it is illustrated in FIG. 1 (prior art) in the above cited US Patent a fused multiply add Floating point unit implementation is disclosed, in which the addition of the addend B and the product A*C is split into an addition part 14 where the operands are overlapping and an incrementer part 16, where they are not overlapping.

If the exponent of the addend is greater than the exponent of the product, and both operands are normalized, then the addend would be aligned that way that the part that does not overlap the product comes down through the incrementer, and the significant part of the intermediate result would be located somewhere in the range of at position 1. All bits in the low part are only relevant for the sticky.

If both operands are normalized, and the addend exponent is equal or smaller than the product exponent, then the both fractions of the operands overlap in that way that the significant part of the intermediate result has to be taken from the adder output at position 2. Non-relevant bits are located in the high part of the intermediate result 17.

In such type of prior art FPU circuitry designs the controlling of the normalization 20 is done out of long LOA and LZA vectors, that are available too late. They do not utilize the possibility to calculate and use the information in which parts of the intermediate result bits of significance come down.

In regard of continuously increasing clock rates of processor units and thus shorter processing cycles the before-mentioned approach has the drawback that the output of the Leading Zero Anticipator (LZA) circuitry is provided too late, especially if the processing data width is high (for example double precision) in order to coincide with the output produced from the CSA. Thus, the information, if or if not a leading zero or leading one, respectively, is present in the leading part of the aligned addend (aligned with the product) is not produced although the teaching of the cited US-patent already considers the parallel calculation of the LZA unit with the ADD operation to be an advantage over the respective prior art associated with the cited U.S.-patent.

SUMMARY OF THE INVENTION

It is thus an objective of the present invention to provide an improved floating point unit of an in-order processor in order to avoid waiting cycles in the normalizer of said floating point arithmetic unit.

According to the primary aspect of the present invention a pre-normalizer control signal generation unit (PCSGU) is connected to said register for receiving said addend B, whereby said PCSGU is determining the leading zero-count of the addend B and is adding the leading zero-count to the shift amount that is calculated for aligning the binary number B, whereby said PCSGU is connected to and controls said pre-normalizer multiplexer, whereby said control signal indicates that the sum is larger than a predetermined value. Thus, according to the basic aspect of the present invention the LZA information of addend B is generated very early and in particular before aligning the addend to the product.

In other words, the present invention implements a control logic 30—referred to herein as pre-normalizer control signal generation unit (PCSGU)—to calculate in an extremely early state of the overall Multiply/Add processing, which parts of the intermediate add result are significant and have to be selected in the pre-normalizer multiplexer to be fed to the normalizer. This is basically done according to the invention by counting the leading zeros of the addend (LAB) right at the beginning of the pipe.

The calculated leading zero count is added to the shift amount (SA) that is calculated to align the addend and is then compared with the width of the incrementer, as can be seen in more detail in FIG. 2. Then the following conclusion may be drawn and taken profit from:

If the sum of (SA+LAB) is larger than the width of the incrementer, which is a constant value, then no significant bits are in the high part of the intermediate result, and the pre-normalizer multiplexer selects the data from a predetermined position 2, otherwise data is read from a predetermined position 1.

Thus, the following advantages may be achieved according to the present invention:

First, a High Sticky information is available to control the first multiplexer (mux) level of the normalizer. So the control signal for the first multiplexer is available one cycle earlier according to the inventive approach in relation to the before discussed prior art. The High-Sticky information can thus be used out of a latch.

Further, the calculation in the PCSGU provided according to the present invention is in a timing uncritical path and does not need a particular, properly modeled circuit design implementation. Thus, the detection of the "High-sticky bit" can be done in a random logic macro, which reduces the design complexity.

Moreover, the required design effort is simpler because random logic is generated automatically and does not need manual schematic design and layout.

Further, the cycle time is improved because the High sticky bit comes out of a latch. So it is available right at the beginning of the cycle instead to mid-cycle time, and driving the first multiplexer level is done earlier in the cycle in relation to the before-discussed prior art. So the data is moved faster through the first multiplexer.

Finally, the implementation process is simpler which results in a faster implementation. This enables an earlier begin of simulation and test phases.

BRIEF DESCRIPTION OF THE DRAWINGS

The present invention is illustrated by way of example and is not limited by the shape of the figures of the drawings in which.

DETAILED DESCRIPTION OF THE PREFERRED EMBODIMENT

Figure 1:
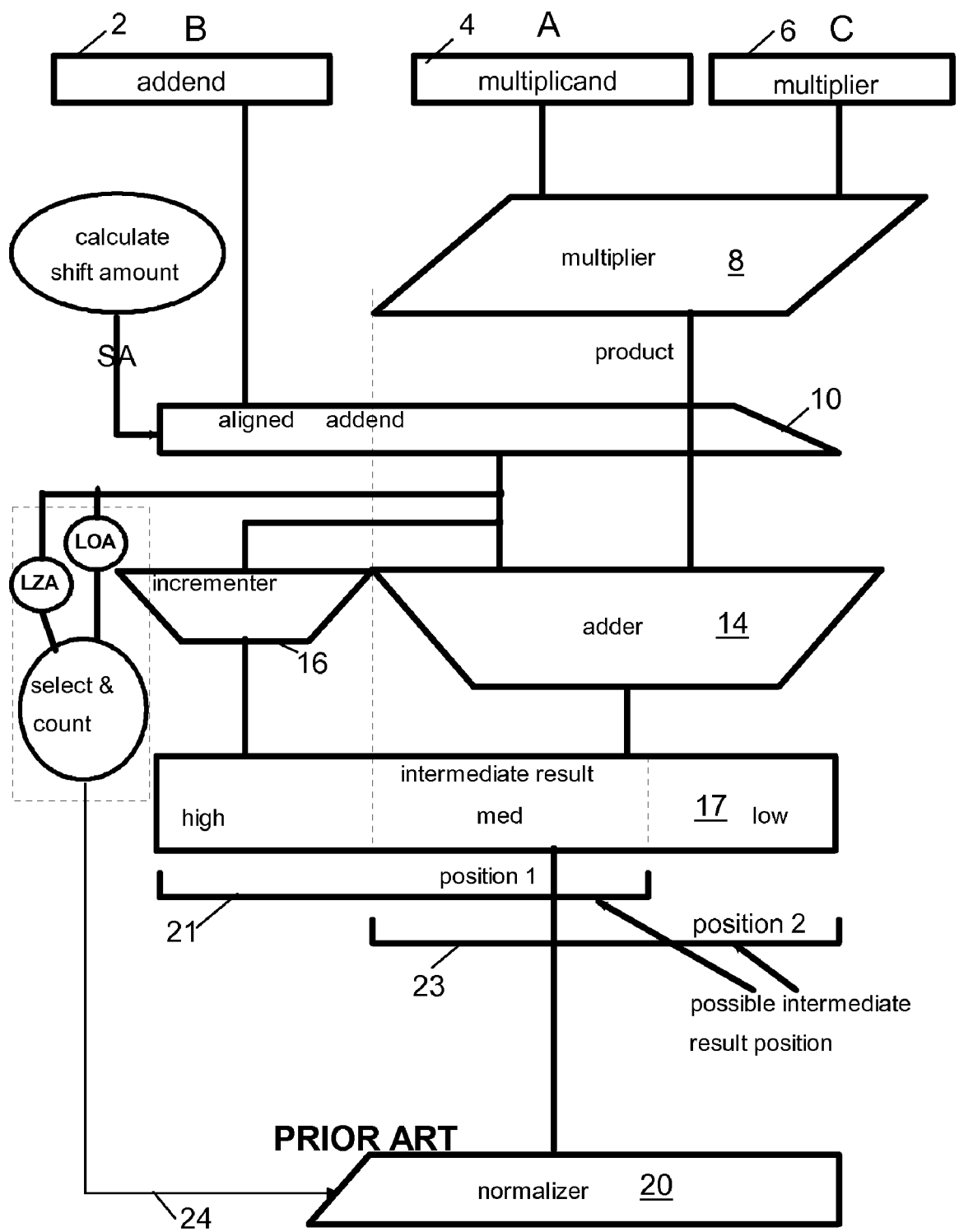
FIG. 1 is a schematic block diagram representation of a prior art fused multipy/ADD floating point unit illustrating the late LZA information.
Figure 2:
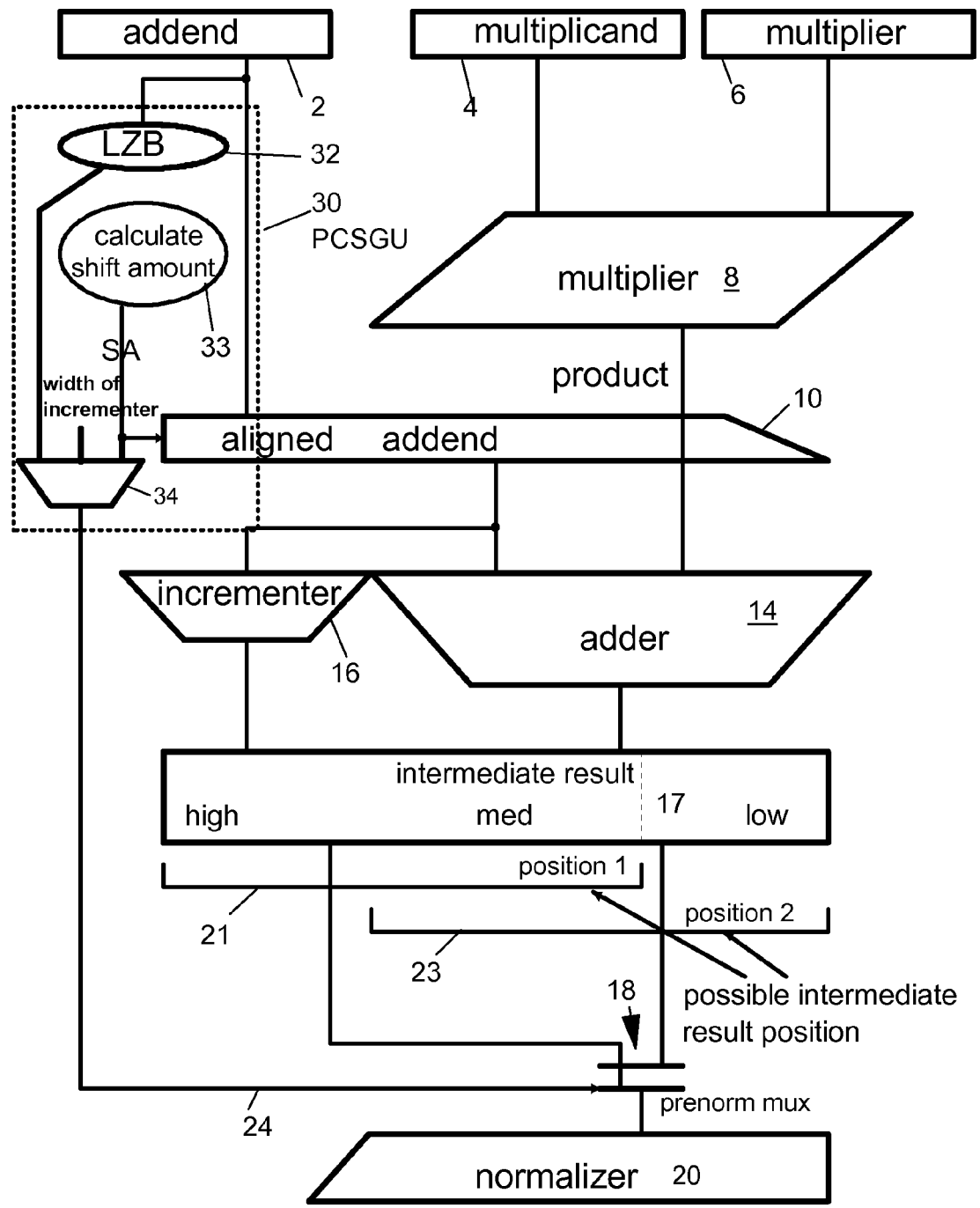
FIG. 2 is a schematic block diagram representation illustrating early high-sticky detection according to a preferred embodiment of the present invention.

With general reference to the figures and with special reference now to FIG. 1b the reader's attention is drawn to the left top portion in FIG. 2, which comprises a rectangle printed in broken lines having reference sign 30. Except of the logic, which calculates the shift amount abbreviated as SA in the drawing the components shown in said rectangle 30 in FIG. 2 are provided according to the present invention. The shift amount refers to the number of bits, which the addend B must be shifted, in order to be aligned with the product of A and C.

In particular, according to this preferred embodiment of the present invention a leading zero bit (LAB) detection circuitry is connected to the input register 2 for the addend operand B. Said LAB circuitry 32 is preferably implemented as a multiple bit wise OR-gate, in which for leading zero detection each single bit wise OR-gate has one input line set to a fixed value of '0'. Thus, the first, i.e. most significant "1" bit in the addend is detected. Of course, an equivalent circuitry may be implemented in order to detect leading "0" bits in a an architecture having a reverse bit meaning.

More particularly, according to this preferred embodiment of the present invention the LAB logic 32 counts the leading zeros of the addend operand B at the very beginning of the pipe. This represents a remarkable advantage over prior art which performs the leading zero detection far more downstream the pipe, —compare FIG. 1b—which is the reason why wait cycles may be generated in front of the normalizer 20 in cases when the prior art sticky bit detection is too slow compared to adder 14.

Further, according to the preferred embodiment depicted in FIG. 2 the leading zero count is added in an adder 34 to the shift amount (SA) which is calculated (as prior art does) to align the addend. Further, the added result (zero count+SA) is compared with the width of the incrementer 16.

Then, according to this preferred embodiment a decision is met: If the sum of shift amount SA+leading zero bits LAB is greater than the constant width of the incrementer 16, then no significant bits are located in the high part of the intermediate result and, consequently, pre-normalizer multiplexer 18 is controlled to select the data from position 2, depicted with reference sign 23. Otherwise, significant bits are found in the high part of the intermediate result 17 and, consequently, the multiplexer 18 is controlled such that the data is selected from position 1 having reference sign 21.

The result of the compare performed in ADD compare logic 34 is used according to the invention as a control signal to control the pre-normalizer multiplexer 18. The advantage is that a high fan out in this control line is avoided. Thus, the high-sticky calculation is very quick according to the invention.

Figure 3:
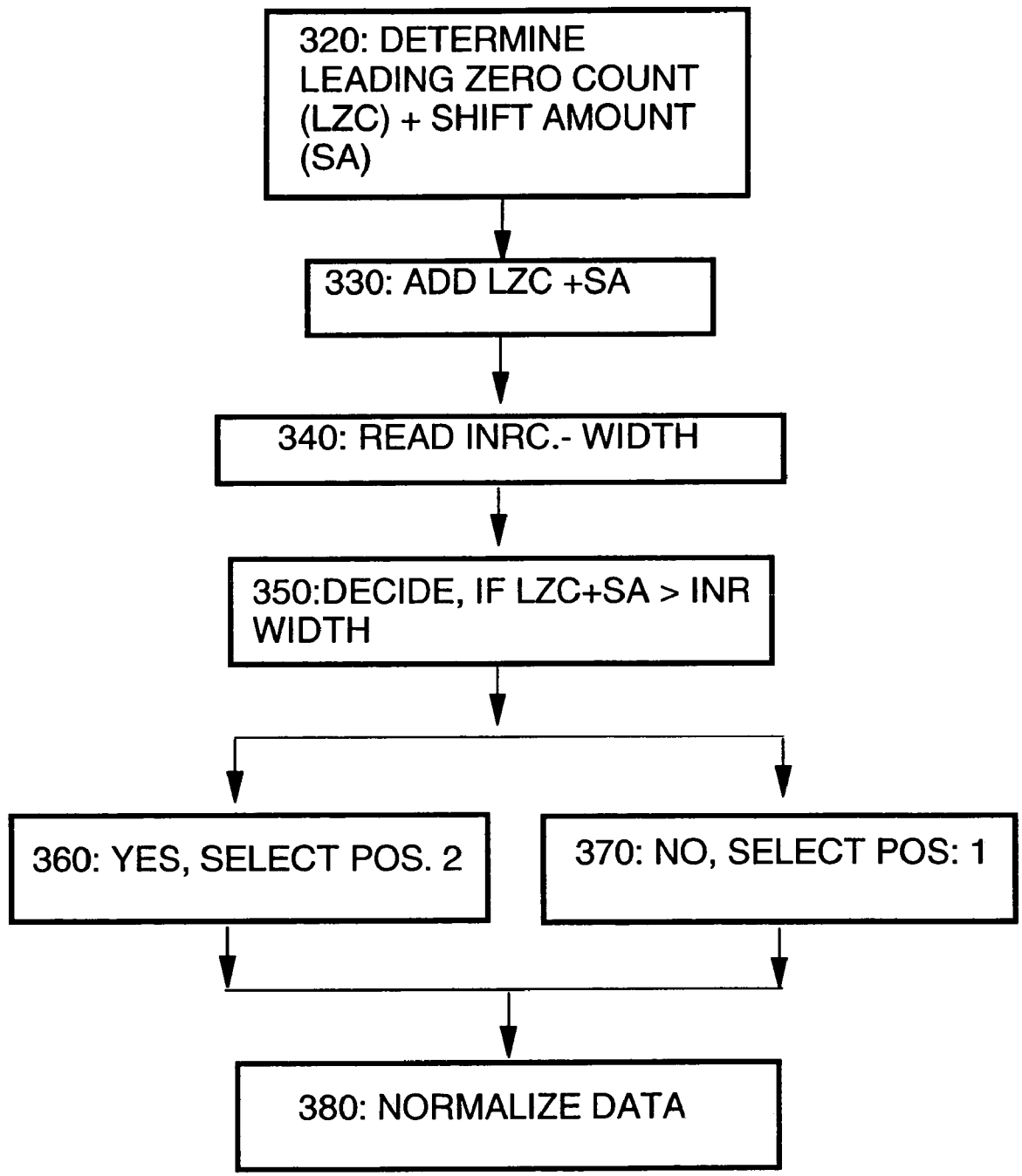
FIG. 3 is a schematic block diagram representation illustrating the basic steps in the control flow of Multiply/Add operation according to the invention.

With reference to FIG. 3 the control flow of the inventive part of the fused multiply ADD FPU is further illustrated in block diagram form: in a first step 320 the leading zero count (LZC) and the above-mentioned shift amount (SA) are determined by the above-mentioned logic circuitry. Then, immediately after said determination of step 320, which takes place at the beginning of the pipeline, in a step 330 LZC and SA are added, and in a step 340 the incrementer width is read. Then, in a step 350 it is decided if LZC+SA is greater than the incrementer width. In the YES-branch thereof, see step 360, the position 2 is selected for reading the intermediate result, whereas in the NO-branch, see step 370 position 1 is selected. Then, in a step 380 the normalization step is performed as usual.

As a person skilled in the art may appreciate, the inventive principle may easily adapted to the inverse scenario, in which a "0" bit plays the role of the "1" bit herein.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A circuit in a floating point processor having fused multiply/add circuitry comprising:
   registers for receiving binary numbers B, A and C;
   a multiplier connected to receive binary numbers A and C to generate a product A*C;
   an aligner connected to receive said binary number B as an addend, said addend B having a fractional part and an exponent part, and said aligner aligning the addend fraction to the fraction of the product by shifting the fractional part of B by a predetermined amount of bits as given by a shift amount calculated separately;
   an adder connected to outputs of said multiplier and said aligner, said adder outputting a calculated sum;
   a pre-normalizer multiplexer for receiving a binary number output from said adder and for shifting said output for normalizing;

a shift control input of said pre-normalizer multiplexer being connected to receive a control-signal reflecting Leading Zero Anticipation (LZA) information associated with said addend;

a pre-normalizer control signal generation unit (PCSGU) connected to one of said registers for receiving said addend B, said pre-normalizer control signal generation unit determining the leading zero-count of the addend B and adding the leading zero-count to said shift amount, and controlling said pre-normalizer multiplexer, whereby said control:signal indicates that the sum is larger than a predetermined value.

2. A floating point processor comprising:

registers in a circuit for receiving binary numbers B, A and C;

a multiplier connected to receive binary numbers A and C to generate a product A*C;

an aligner connected to receive said binary number B as an addend, said addend B having a fractional part and an exponent part, and said aligner aligning the addend fraction to the fraction of the product by shifting the fractional part of B by a predetermined amount of bits as given by a shift amount calculated separately;

an adder connected to outputs of said multiplier and said aligner, said adder outputting a calculated sum;

a pre-normalizer multiplexer for receiving a binary number output from said adder and for shifting said output for normalizing;

a shift control input of said pre-normalizer multiplexer being connected to receive a control-signal reflecting Leading Zero Anticipation (LZA) information associated with said addend;

a pre-normalizer control signal generation unit (PCSGU) connected to one of said registers for receiving said addend B, said pre-normalizer control signal generation unit determining the leading zero-count of the addend B and adding the leading zero-count to said shift amount, and controlling said pre-normalizer multiplexer, whereby said control:signal indicates that the sum is larger than a predetermined value.

3. A computer system comprising:

registers in a floating point processor for receiving binary numbers B, A and C;

a multiplier connected to receive binary numbers A and C to generate a product A*C;

an aligner connected to receive said binary number B as an addend, said addend B having a fractional part and an exponent part, and said aligner aligning the addend fraction to the fraction of the product by shifting the fractional part of B by a predetermined amount of bits as given by a shift amount calculated separately;

an adder connected to outputs of said multiplier and said aligner, said adder outputting a calculated sum;

a pre-normalizer multiplexer for receiving a binary number output from said adder and for shifting said output for normalizing;

a shift control input of said pre-normalizer multiplexer being connected to receive a control-signal reflecting Leading Zero Anticipation (LZA) information associated with said addend;

a pre-normalizer control signal generation unit (PCSGU) connected to one of said registers for receiving said addend B, said pre-normalizer control signal generation unit determining the leading zero-count of the addend B and adding the leading zero-count to said shift amount, and controlling said pre-normalizer multiplexer, whereby said control-signal indicates that the sum is larger than a predetermined value.

* * * * *